Dec. 16, 1941.  F. W. RITCHIE  2,266,680
APPLICATOR
Filed Aug. 26, 1940  2 Sheets-Sheet 1
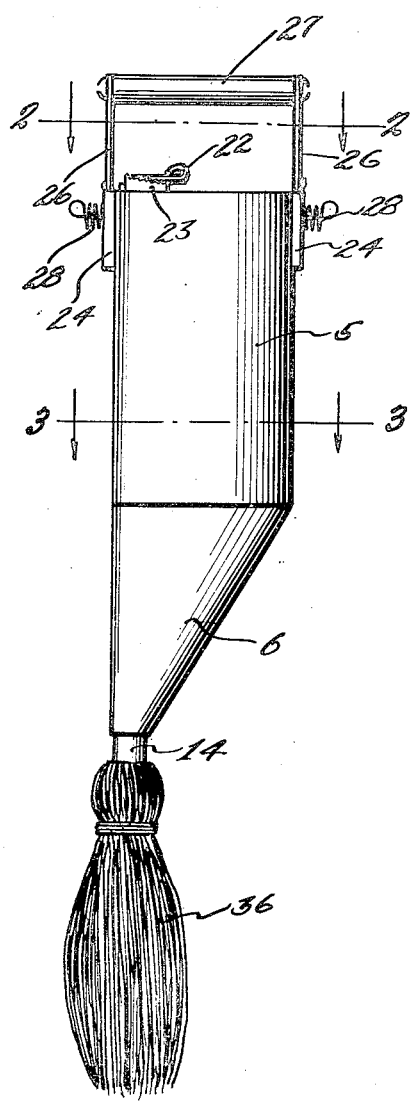
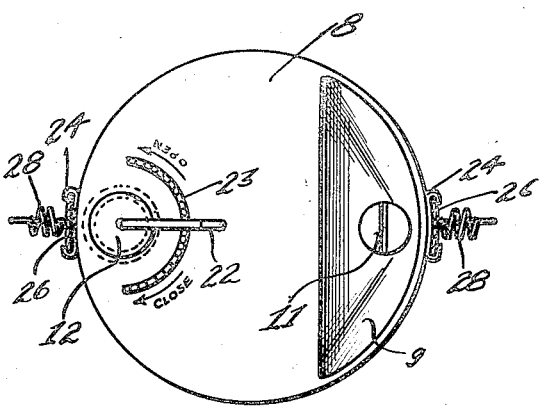
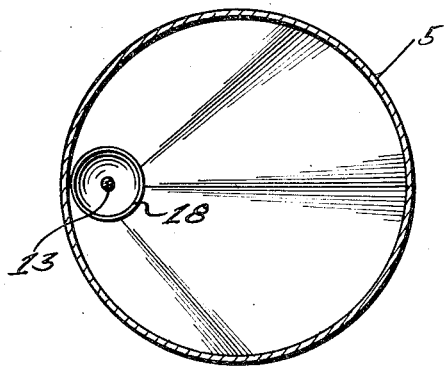
Inventor
Frederick W. Ritchie
By Clarence A. O'Brien
Attorney Dec. 16, 1941.  F. W. RITCHIE  2,266,680
APPLICATOR
Filed Aug. 26, 1940   2 Sheets—Sheet 2
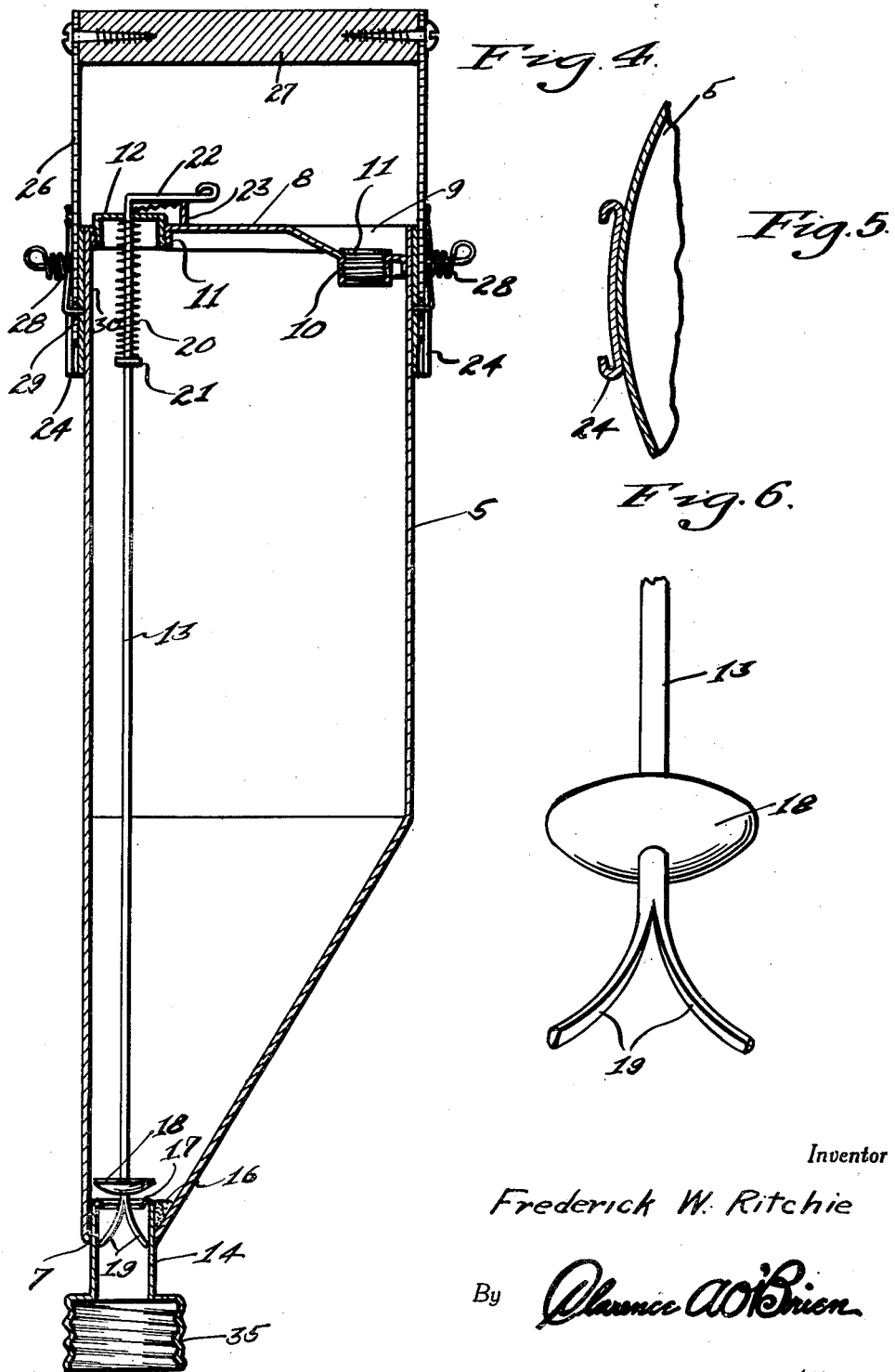
Inventor
Frederick W. Ritchie
By Clarence A. O'Brien
Attorney Patented Dec. 16, 1941

2,266,680

UNITED STATES PATENT OFFICE 2,266,680

APPLICATOR

Frederick W. Ritchie, Eatonton, Ga.

Application August 26, 1940, Serial No. 354,305

1 Claim. (Cl. 221—15)

This invention relates broadly to dispensers and more particularly to what may be termed an "applicator," the object of the invention being to provide a device for facilitating the applying of liquids such as liquid poisons, disinfectants, and the like to growing plants.

Further in accordance with the present invention a device is provided whereby such liquid may be applied to the under or bottom surfaces of the leaves of the plant in an efficient manner and without injury to such leaves, to the end that the liquid applied thereto will not be readily washed off of the leaves by rain as now is generally the case.

The invention together with its objects and advantages will be best understood from a study of the following description taken in connection with the accompanying drawings wherein—

Figure 1 is a side elevational view of the applicator.

Figures 2 and 3 are horizontal sectional views taken substantially on the lines 2—2 and 3—3, respectively, of Figure 1.

Figure 4 is an enlarged longitudinal sectional view through the device.

Figure 5 is a fragmentary detail sectional view showing a guide member for the leg of an adjustable handle forming part of the invention, and Figure 6 is a perspective view of a valve member forming part of the invention.

Referring more in detail to the drawings it will be seen that the device comprises a substantially cylindrical barrel 5 the lower portion 6 of which is tapered in the manner shown for directing the liquid contents of the barrel to a discharge opening 7 in the bottom of the barrel.

The barrel 5 is provided at the top or upper end thereof with a wall 8, and the wall 8 adjacent the periphery of the barrel is formed with a depression 9 that serves in the nature of a funnel for directing fluid into the barrel 5 through a flanged filling opening 10 formed in the depressed portion 9 of the wall 8. A threaded closure plug 11 is provided for the opening 10 as shown in Figure 4.

Also formed in the top wall 8 of the barrel 5 is a flanged opening 11 and accommodated within the opening 11 is an externally threaded plug 12. The plug 12 serves as a guide for a valve rod 13 that operates through a suitable opening provided therefor in the plug 12.

Extending through the discharge opening 7 in the bottom of the barrel 5 is a discharge neck 14 that is suitably anchored in position by solder or the like 16 as shown in Figure 4.

The inner end of the neck 14 is formed to provide a seat 17 for a concavo-convex valve 18.

The valve 18 is fixedly secured on the rod 13 inwardly from one end of the rod 13; said rod 13 at said one end being split longitudinally and the portions of the rod formed by the split spread apart and curved outwardly from one another in order to provide a pair of flexible guide fingers 19 that work within the discharge tube 14 and serve to insure the proper movement of the valve rod 13 and consequently proper seating of the valve 18 on its seat 17.

The valve 18 is normally urged into engagement with its seat 17 through the medium of a coil spring 20 that is disposed about the upper end of the rod 13 and at one end impinges against the plug 12 and at an opposite end impinges against the collar 21 on the rod 13 as shown.

At the upper end thereof the rod 13 is provided with a laterally directed integral handle 22 and this handle is normally urged into yielding engagement with a semi-circular rack bar 23 provided on the wall 8 and disposed substantially circumjacent to the plug 12 as shown.

The rack bar 12 tapers from one end to the other thereof so that as the handle 22 is swung upwardly of the inclined toothed edge of the bar 23 rod 13 against the action of spring 20 will move upwardly to unseat the valve 18; while when the handle 22 is moved towards the minor end of the bar 23, rod 13 under action of spring 20 will move in a direction to cause the valve 18 to seat on its seat 17 thus cutting off flow of fluid from the barrel 5 through the discharge neck 14.

Also in accordance with the present invention the barrel 5 adjacent the upper end thereof is provided on diametrically opposite sides thereof with channel guides 24—24.

The guides 24 accommodate the legs 26 of a suitable handle 27.

The legs 26 are detachably secured in the guides 24 through the medium of spring latches 28 that engage in aligning openings, 29, provided in the legs 26, and 30, provided in the walls of the channel guides 24.

Thus it will be seen that the handle may be readily attached to or detached from the barrel 5 as found desirable.

It will also be noted that each latch 28 is formed from a single length of wire the intermediate portions of which are bent into a substantial U, with one leg of the U coiled about the opposite leg of the U in order to provide for the latch a handle; one end of the wire being welded or otherwise secured to a leg 26, and the opposite end of the wire being bent to form the bill or hook portion of the latch for engaging in aligned openings 29 and 30 as shown.

From the description of the invention thus far it will be seen that in use the tool is held in one hand, with said one hand grasping the handle 27, and while the applicator is being swung back and forth over the plant the operator, with the other hand manipulates the handle 22 of the valve rod 13 for moving the valve 18 to the desired position of adjustment for controlling flow of the liquid contents of the barrel through the discharge spout or neck 14 onto the plant.

Also in accordance with the present invention the discharge spout or neck 14 at its outer end is diametrically enlarged and threaded as at 35 to facilitate the attaching thereto of a brush or analogous element 36 for wiping engagement with the leaves of the plant. When the attachment 36 is used the same will serve to cause the leaves of the plant to roll or fold so that the under surfaces of such leaves will be exposed and will receive some of the contents of the barrel 5 during the discharge of such contents. Such an attachment 36 will be found especially useful when spraying cotton plants, and when so used will provide for a substantial "mopping" of such plant, a treatment which is very conducive to the flourishing of cotton plants.

It is thought that a clear understanding of the construction, operation, manner of use, and advantages of a device of this character will be had without a more detailed description thereof.

It will also be understood that while I have herein shown and described a preferred embodiment of the invention, it is in no wise intended to restrict the invention to the precise details of construction, combination and arrangement of elements herein illustrated and described, other than as may be required by the prior art and scope of the claim hereunto appended.

Having thus described the invention what is claimed as new is:

In a device of the class described, a barrel having a closed top and a lower tapered end terminating in a tubular discharge neck forming a valve seat in said end, a centrally apertured plug in the top of the barrel, a valve rod extending through the aperture in said plug and into said neck for vertical sliding and rotary adjustment and having a lower split end forming downwardly diverging prongs slidably engaging said neck to provide a two-point open bearing against said neck for centering said rod relative to said neck during adjustment thereof and obviating resistance to discharge of liquid through said neck, a disc type valve on said rod for engagement with and disengagement from said valve seat under downward and upward adjustments of the rod, respectively, means to urge said rod downwardly including a coil spring on the rod bearing at one end against said plug, a manipulative crank arm on the upper end of said rod for swinging to rotate the rod, and an arcuate cam on said top having a toothed oblique upper edge for underlying engagement with said crank arm, whereby under swinging of the crank arm in opposite directions, said crank arm and rod will be forced upwardly by said edge and downwardly by said spring, respectively, into different set positions to variably control said valve, said plug being detachable from said top to remove the rod, valve and spring therewith from said barrel as a unit.

FREDERICK W. RITCHIE.